United States Patent [19]
Wold

[11] Patent Number: 5,746,355
[45] Date of Patent: May 5, 1998

[54] DISPENSER FOR PULVERULENT MATERIAL

[75] Inventor: Kermit A. Wold, Plymouth, Minn.

[73] Assignee: Cargill, Incorporated, Minneapolis, Minn.

[21] Appl. No.: 617,479

[22] Filed: Mar. 15, 1996

[51] Int. Cl.$^6$ ................................................ G01F 11/28
[52] U.S. Cl. ............. 222/189.02; 222/426; 222/441; 222/448; 222/449; 222/451; 222/565
[58] Field of Search ................. 222/189.02, 426–430, 222/441, 448, 449, 450, 451, 565

[56] References Cited

U.S. PATENT DOCUMENTS

| | | | |
|---|---|---|---|
| 249,464 | 11/1881 | Farnham | 222/441 X |
| D. 265,373 | 7/1982 | Christensen | 222/189.02 X |
| 448,275 | 3/1891 | Stowell | 222/449 |
| 1,053,316 | 2/1913 | Psikal | 222/441 |
| 1,173,768 | 2/1916 | Byerley | 222/449 X |
| 1,361,146 | 12/1920 | Egnatoff | 222/441 X |
| 1,607,530 | 11/1926 | Guest | 222/441 |
| 1,653,096 | 12/1927 | Henson | 222/449 X |
| 1,768,091 | 6/1930 | Adair | 222/448 X |
| 1,857,734 | 5/1932 | Moldovan et al. | 222/451 X |
| 1,883,771 | 10/1932 | Duncan | 222/565 X |
| 2,005,919 | 6/1935 | Militello | 222/448 X |
| 2,041,887 | 5/1936 | Ward | 222/449 |
| 2,318,676 | 5/1943 | Deland | 222/451 |
| 2,500,059 | 3/1950 | Burnham | 222/451 |
| 2,561,696 | 7/1951 | Hammer | 222/449 |
| 2,610,432 | 9/1952 | Ambrose | 222/565 X |
| 2,815,153 | 12/1957 | McCarthy | 222/441 |
| 3,934,764 | 1/1976 | Rebmann | 222/451 |
| 4,109,835 | 8/1978 | Castro | 222/451 X |
| 4,424,921 | 1/1984 | Feuerstein et al. | 222/456 |
| 4,961,521 | 10/1990 | Eckman | 222/142.5 |
| 5,169,049 | 12/1992 | Krupic et al. | 227/456 |

FOREIGN PATENT DOCUMENTS

| 2700315 | 7/1994 | France | 222/449 |
|---|---|---|---|

*Primary Examiner*—Kevin P. Shaver
*Attorney, Agent, or Firm*—Fitch, Even, Tabin & Flannery

[57] ABSTRACT

A dispenser for pulverulent materials includes receptacle for receiving a container holding the material to be dispensed. A valve body defining metering cavities is mounted in the valve body. A gate also mounted in the valve body includes a first portion for selectively locking flow into the metering cavities and a second portion for selectively blocking flow exiting the metering cavities, with a desired quantity of material being trapped between the gate portions, for subsequent release.

13 Claims, 5 Drawing Sheets

1

DISPENSER FOR PULVERULENT MATERIAL

BACKGROUND OF THE INVENTION

1. Field of the Invention

The present invention pertains to dispensers for pulverulent materials and in particular to edible materials such as condiments and spices.

2. Description of the Related Art

Over the years a number of arrangements have been proposed for dispensing edible pulverulent materials. For example, U.S. Pat. Nos. 4,424,921; 4,961,521; and 5,169,049 disclose dispensers for granulated materials such as edible salt. These devices require a container holding a supply of the material to be inverted and thereafter shaken. Typically, these devices are filled from a bulk container and because of the required manual motions of inversion and shaking the devices are of relatively small size and a great number of dispensing operations are required in a relatively short time. However, improvements in providing metering arrangements which do not require special preparations to implement each dispensing cycle, and improvements in the ergonomic design, and ability to accept commercially available bulk packages are still being sought or subject to improvement.

SUMMARY OF THE INVENTION

It is an object of the present invention to provide improved apparatus for metering and dispensing pulverulent material.

Another object of the present invention is to provide apparatus of the above-described type particularly suitable for use with granulated materials, such as edible salt.

Another object of the present invention is to provide apparatus of the above-described type which can accept readily available commercial bulk packages of the pulverulent material, with a minimum of preparation.

Another object of the present is to provide apparatus of the above-described type in which a dispensing cycle can be carried out without requiring inversion of the apparatus.

These and other objects of the present invention are provided in a dispenser for pulverulent materials, comprising:

a receptacle for receiving a container holding the material, including a support wall for supporting the container, with the support wall defining an opening;

a valve body disposed in the receptacle adjacent the support wall, the valve body defining metering cavities aligned with the support wall opening to receive material from the container which flows through the support wall opening;

a gate mounted in the receptacle adjacent the valve body for movement between first and second positions, with the gate blocking flow out of the valve body in the first position and blocking flow through the support wall opening into the valve body, while opening the valve body to dispense material in the metering cavities in the second position; and a gate actuation means operable to move the gate between the first and second positions.

DETAILED DESCRIPTION OF THE PREFERRED EMBODIMENTS

Figure 1:
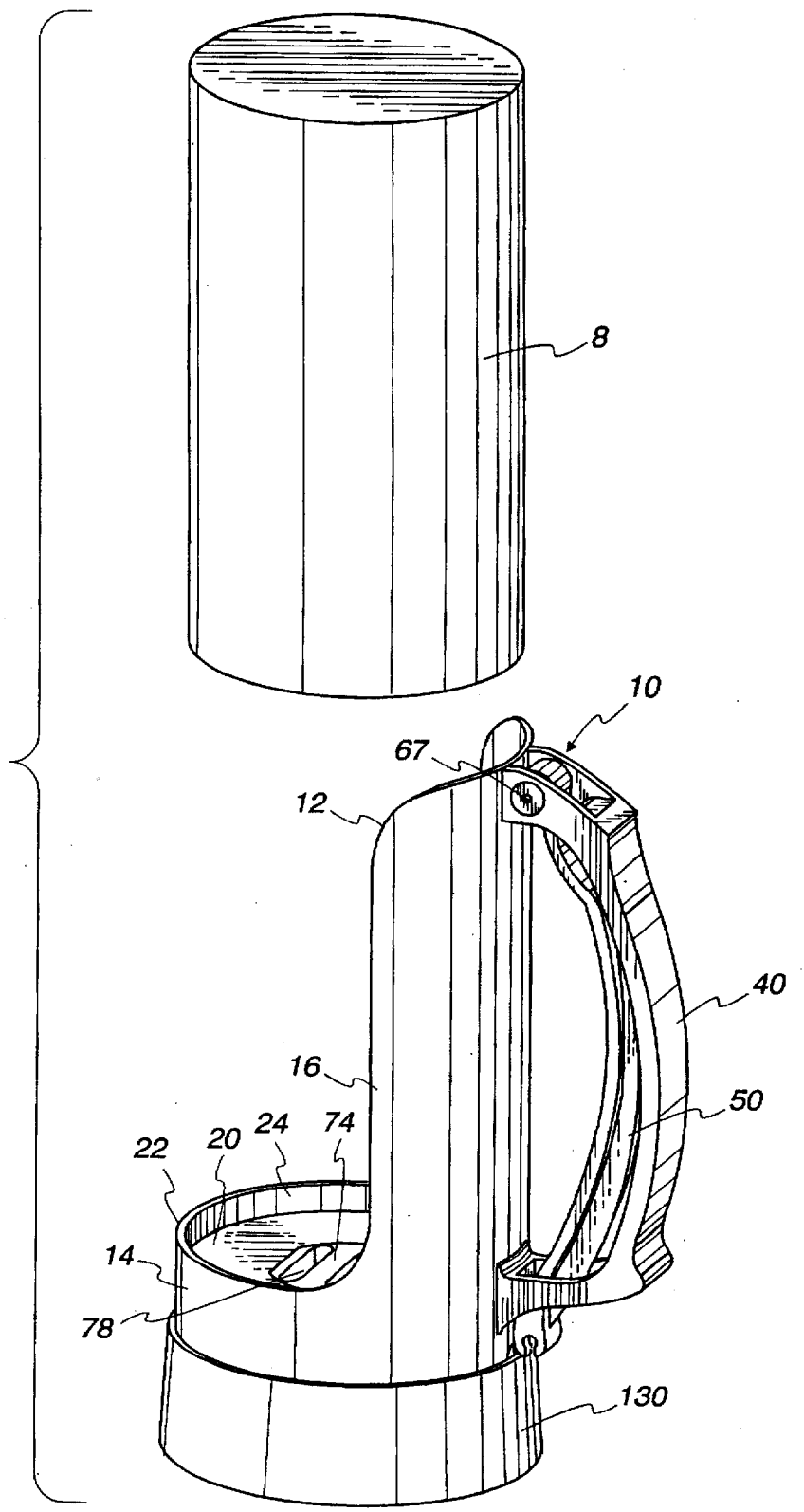
FIG. 1 is an exploded perspective view of a combination of a dispenser and container illustrating principles of the present invention.
Figure 2:
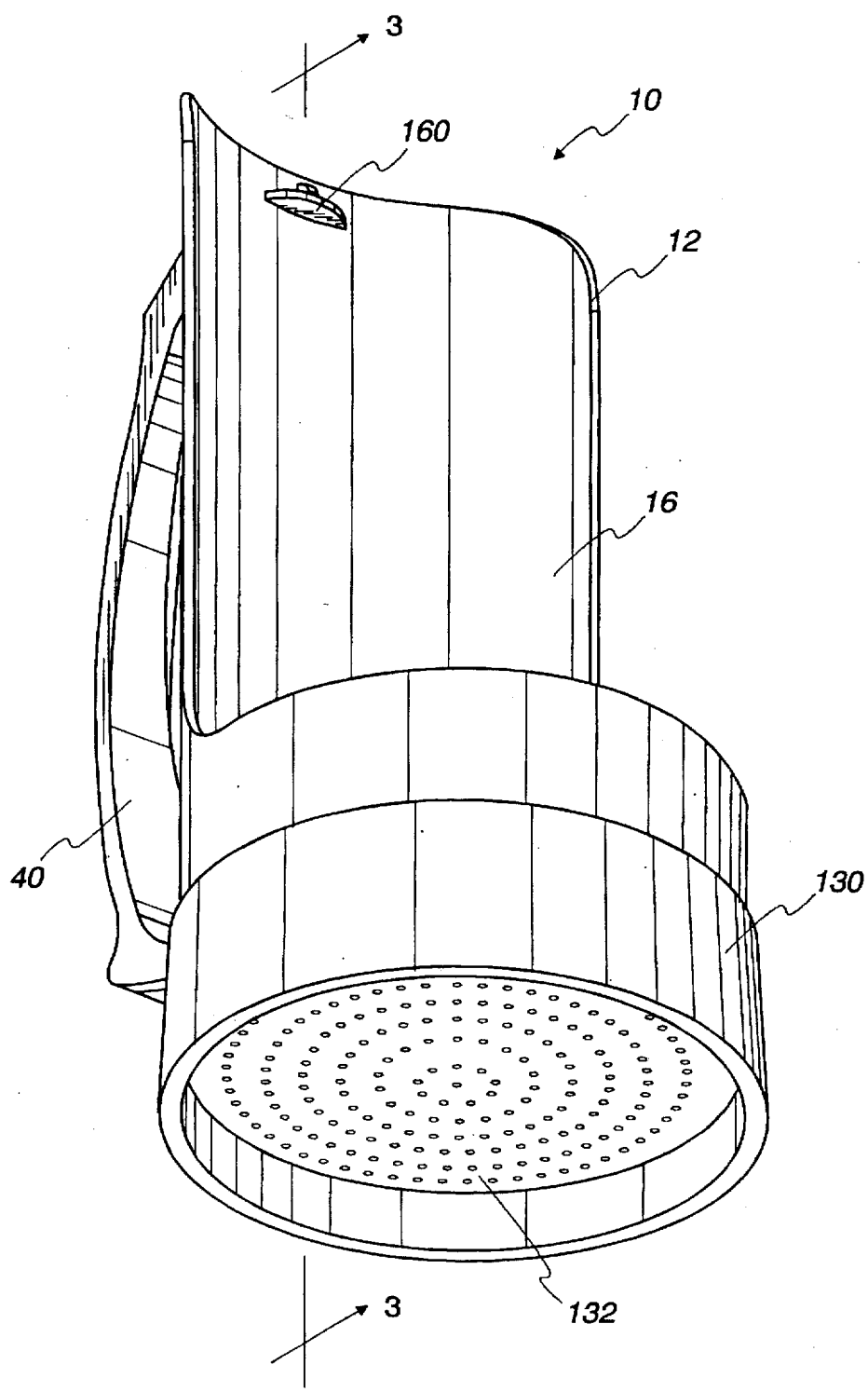
FIG. 2 is a perspective view of the dispenser thereof.

Turning now to the drawings, FIG. 1 shows a dispenser for pulverulent materials generally indicated at 10. FIG. 1 also shows a container 8 for holding a supply of the pulverulent material. Dispenser 10 is adapted to accommodate commercially available packages of salt seasoning which typically employ containers of cylindrical shape, made of paperboard or plastic material. It has been found that these packages, typically referred to as "rounds," provide a convenient bulk source of salt seasoning to be dispensed.

Dispenser 10 is preferably made of food-compatible materials such as plastics, plastic alloys and stainless steel. The valve body to be described herein is preferably made of a DELRAN plastic material. It will be readily appreciated that the dispenser may be readily adapted to receive pulverulent material from a wide variety of different sources, such as containers of different shape and flexible conduits, and not just cylindrical "rounds". Dispenser 10 includes a scoop-like receptacle 12 preferably made of plastic material, and having a generally cylindrical base portion 14 and an upstanding partial wall portion 16. Wall portion 16 of the preferred embodiment is part cylindrical and has a generally arcuate cross-section when viewed in various horizontal cross-section planes.

Figure 3:
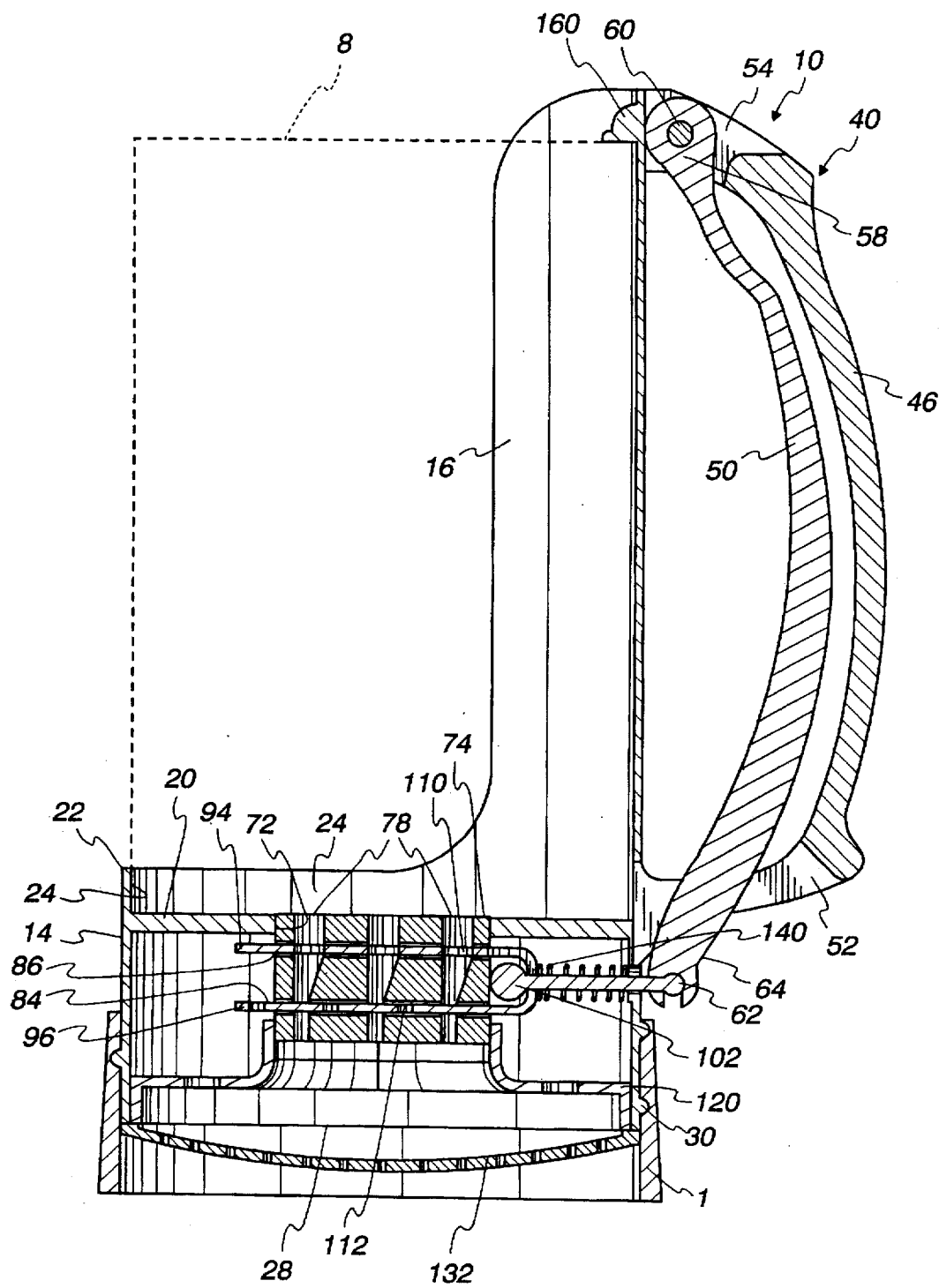
FIG. 3 is a cross-sectional view taken along the line 3—3 of FIG. 2.
Figure 4:
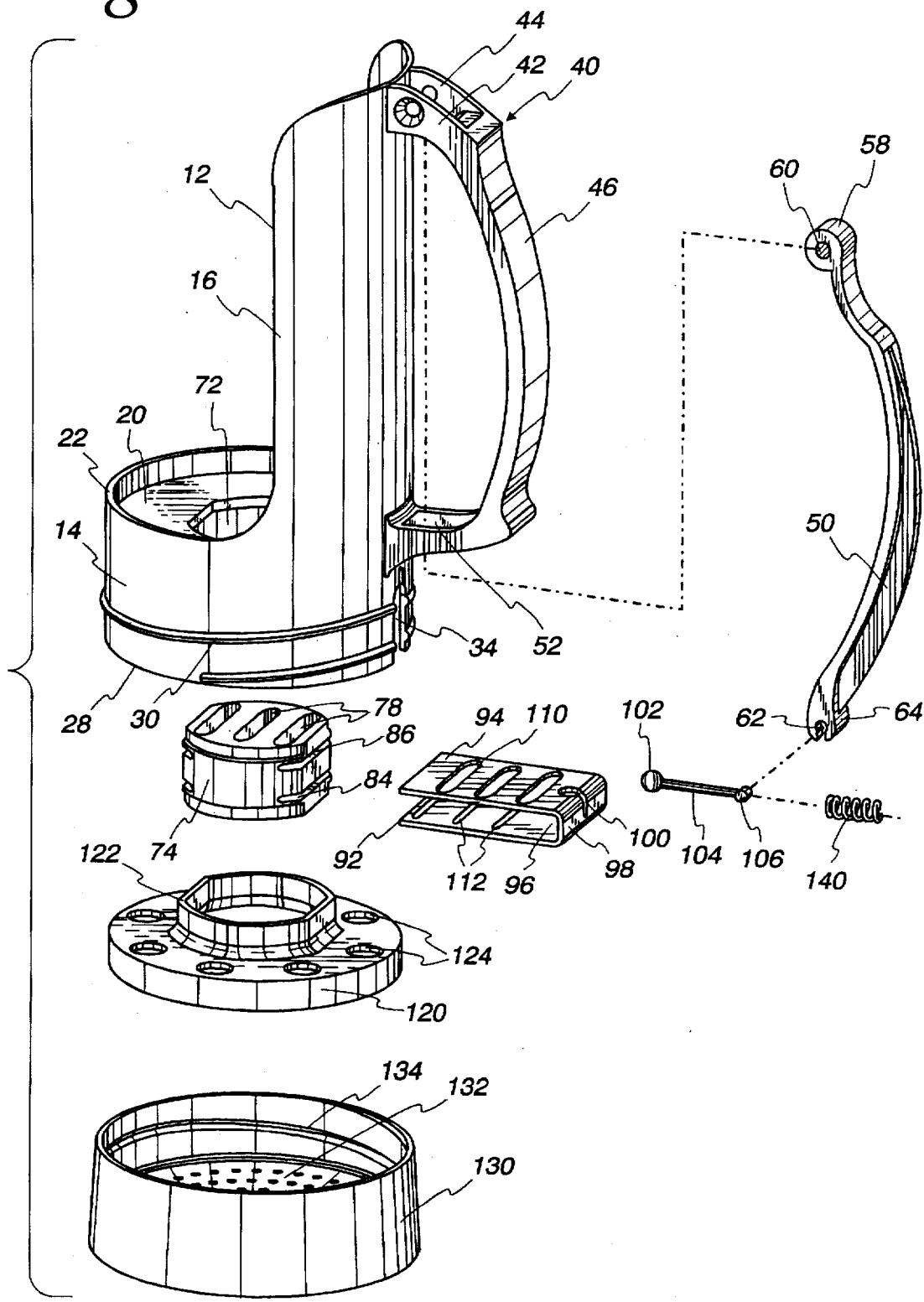
FIG. 4 is an exploded perspective view of the dispenser.

Dispenser 10 further includes a support wall 20 which is preferably recessed below the upper edge 22 of base 14, such that the base provides an upstanding rim 24 encircling support wall 20. As indicated in the cross-sectional view of FIG. 3, support wall 20 is preferably integrally formed with base 14, although, if desired, the support wall could be separately formed from the base and could be made of a material different from that of the base. As can be seen in FIGS. 3 and 4, for example, the base 14 extends a considerable distance below support wall 20, and terminates at a bottom free edge 28. FIG. 4 shows a series of fastening threads 30 are formed on the outer surface of the receptacle base, preferably adjacent the bottom edge 28, and an opening 34 is formed in the base so as to extend from the bottom edge 28.

Referring generally to FIGS. 1-5, a handle 40 extends from the outside of receptacle 12 and, as can be seen in FIG. 4, is generally aligned above opening 34. Handle 40 has a generally U-shaped cross-section with a pair of opposed sidewalls 42, 44 extending on either side of a joining wall 46. As can be seen in FIG. 4, joining wall 46 is stopped short of the ends of the sidewalls 42, 44 so as to form slotted openings. As indicated in FIG. 4, operating means such as an operator member 50 is installed by insertion through slot 52 formed at the lower end of handle 40 and has an upper end which is received in the slot 54 (see FIG. 3) formed at the upper end of handle 40. As indicated in FIG. 3, handle 40 is preferably integrally formed with receiver 12, with the receiver being formed as an integral unitary molded part. However, the handle 40 could be separately formed from the receiver, and if desired, could be made of a material different from that of the receiver as well.

Referring to FIG. 4, operator member 50 has an upper end 58 defining a passageway 60, while a downwardly opening recess 62 is formed at the bottom end 64 of the operator.

With reference to FIG. 1, for example, the upper end 58 of operator 50 is secured to handle 40 with a pin fastener 68. Accordingly, the bottom end 64 of operator member 58 is free to swing in an arcuate path between the receptacle base 14 and the interior of handle 40 (i.e. that portion of handle 40 facing receptacle wall 16).

Figure 5:
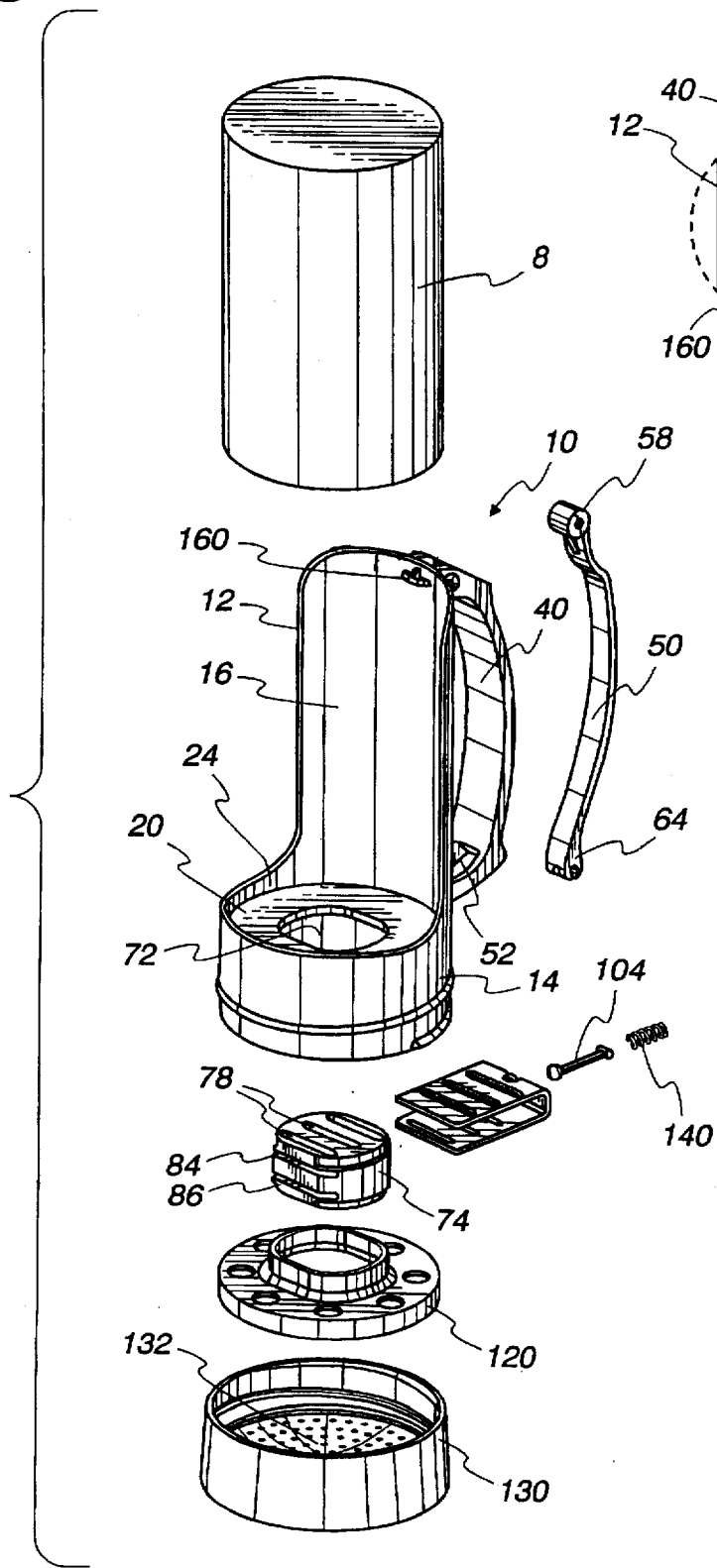
FIG. 5 is an exploded perspective view of the combination of FIG. 1.
Figure 6:
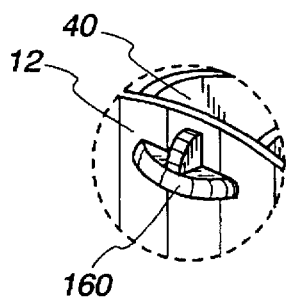
FIG. 6 is a fragmentary perspective view on an enlarged scale of the upper end of the dispenser shown in FIG. 5.

As can be seen, for example, in FIG. 5, a relatively large-sized aperture 72 is formed in support wall 20. An assembly of parts which together function to meter a flow of pulverulent material from container 8 through dispenser 10 is shown in exploded perspective view aligned for mating engagement with the support wall. Included is a valve body 74 having a modified cylindrical shape, with opposed, generally parallel top and bottom surfaces. A plurality of metering cavities 78 extend through the valve body between its top and bottom surfaces, as can be seen, for example, in FIG. 3. As indicated in FIG. 3, the upper end of valve body 74 is configured so as to be received in aperture 72 of support wall 20, preferably with a close tolerance fit, which grips the valve tightly, or with a looser fit which allows some movement of the valve in the aperture, so as to provide self alignment with the actuator linkage.

As can be seen, for example, in FIGS. 3–5, a pair of slotted apertures 84, 86 extend laterally, preferably horizontally, through the valve body to receive gate means. Referring then to FIG. 4, a gate member 92 is preferably formed of stamped sheet metal and includes overlying first and second plate-like portions 94, 96, respectively, joined together by a joining portion 98. A keyed slot 100 is formed in joining portion 98 so as to receive a first end 102 of a link rod 104. The first end 102 of the link rod is preferably part spherical in configuration. The second end 106 of the link rod is preferably part cylindrical in configuration, so as to be received in recess 62 of operator 50. As can be seen in FIG. 4, the gate portions 94, 96 each include a plurality of openings, preferably three in number for each plate portion. The openings 110 of the first plate portion 94 are, however, laterally offset with respect to the openings 112 of the second gate portion 96. The upper and lower gate portions 94, 96 are slidingly received in the passageways 84, 86 of valve body 74 as can be seen, for example, in FIG. 3.

Referring again to FIGS. 3–5, a valve plate 120 includes a collar portion 122 at its upper end, dimensioned to receive the lower end of valve body 74, preferably with a tight fit. Valve plate 120 preferably includes a plurality of apertures 124 spaced about its outer periphery, which are conveniently located for releasing any material which may accumulate above the valve plate. With reference to FIG. 3, valve plate 120 is received in the lower end of receptacle 12 and cooperates with support wall 20 to hold valve body 74 in its desired operating position. A cap 130 includes a screen 132 and fastening threads 134 dimensioned for threading engagement with threads 30 of the receptacle. If desired, other arrangements can be used to secure the cap to the receptacle. For example, the cap can be fit to the receptacle with a friction fit, or resilient catches can be formed in the receptacle and/or cap.

FIG. 3 shows the cap 130 installed at the lower end of receptacle 12, with the valve plate 120 held in its desired operating position. Preferably, the valve body is snap fit to valve plate 120, with the resulting assembly being inserted in receptacle to allow the free end of the valve body to be snap fit to the receptacle wall 20.

However if desired, the valve plate 120 can be pressed between screen 132 and the lower gate portion 96 which is held captive in valve body 74. The upper portion 94 of gate 92 could be made to interfere with support wall 20 and with the valve body being allowed to "float", by providing sufficient clearance in the opening 72 of support wall 20 and in the opening formed by collar 122 of valve plate 120.

As can be seen in FIG. 3, a coiled spring 140 is held captive on tie rod 104, and in the rest position indicated in FIG. 3, the gate member is biased toward the left-hand portion of FIG. 3, with operator member 50 being drawn away from handle 40. In the rest position indicated in FIG. 3, the openings 110 in the upper plate-like portion 94 are aligned with the metering cavities 78 in the valve body, so as to receive pulverulent material from container 8 which rests on support wall 20. Preferably, the metering cavities and openings in the gate means are sized so as to allow material in container 8 to freely flow into the metering cavities 78. As can be seen in FIG. 3, the lower plate-like portion blocks flow through the metering cavities, and accordingly material is accumulated in that portion of the metering cavities located above the lower plate-like portion. It is important that the material be allowed to fill that portion of metering cavities 78 located between the upper and lower gate portions, if accurate metering is to be achieved.

When a dispensing operation is desired, a user squeezes operator member 50 against handle 40. This pulls the gate member toward the right-hand portion of FIG. 3, bringing the openings 110 in the upper gate portion into blocking communication with metering cavities 78. At the same time, the openings 112 in the lower plate-like portion are aligned with the metering cavities, so as to allow material accumulated in the metering cavities, between the upper and lower plate-like portions, to fall below the valve body. This material accumulates on screen 132 such that, with a shaking motion by the user, the metered quantity of material is released from dispenser 10.

With reference to FIG. 3, it will be noted that metering cavities 78 do not have a uniform cross-section throughout their length. Rather, the upper ends of the metering cavities 78 are enlarged, while the lower ends of the metering cavities are of a reduced cross-sectional opening. Further, the metering cavities of the preferred embodiment have a transition which is angled in cross-section. Accordingly, that portion of the metering cavities in which metered portions of material are accumulated has a volume which has a generally trapezoidal cross-section. Volumes of other shapes are, of course, possible and are contemplated by the present invention. For example, the metering cavities can have a generally conical configuration. Further, while the openings in the gate means and valve body are generally the same shape (i.e. generally rectangular) the openings in the gate means can be different in shape than the openings in the valve body, and, if desired, the shapes of the openings in the gate member can be varied between upper and lower portions and even within respective gate portions, if desired. Further, the height of the valve body can be increased or reduced as desired to change the size of the metering cavities, and the number of metering cavities can be changed as well, if desired.

It will be appreciated that different valve bodies and gate members can be readily interchanged in a dispensing device, so as to provide different metered quantities delivered with a dispensing operation. One advantage of the present invention is that the user of the dispensing device will not need to perform any substantial adjustments to operate differently calibrated dispensing mechanisms, since the ergonomics of the dispensing operations will be the same. It should be noted that the dispenser 10 is operated without inversion and remains upstanding.

It is possible, due to misuse or contamination of the mechanism with foreign matter, that the handle may become jammed in operation. However, as will be appreciated, the dispenser will not allow the contents of container 8 to run through the valve components. Rather, with the present invention, only a quantity of material accumulated in the metering cavities and between the gate portions will be allowed to enter the dispenser mechanism.

Referring to FIGS. 3–6, the container 8 is preferably held in position in the dispenser by telescopically inserting the bottom end of the container within the upstanding rim 24, until the bottom of the container rests against support wall 20. The top of the container is then tucked under a retaining tab 160 located on the inner surface of receptacle wall 16. This simple securing operation has been found to be adequate, especially since inversion of the dispenser mechanism is not required for its operation. Other conventional arrangements can be provided for securing container 8 within the dispenser receptacle.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A dispenser for pulverulent materials, comprising:

a receptacle for receiving a container holding the material, including a support wall for supporting the container, with the support wall defining an opening;

a valve body mounted in the receptacle adjacent the support wall, the valve body defining metering cavities aligned with the support wall opening to receive material from the container which flows through the support wall opening;

a gate means mounted in the receptacle adjacent the valve body for movement between first and second positions, with the gate means blocking flow out of the valve body in the first position and blocking flow past the support wall opening into the valve body, while opening the valve body to dispense material in the metering cavities in the second position; and a screen mounted to the receptacle adjacent the support wall, with the valve body between the screen and the support wall.

2. The dispenser of claim 1 further comprising a valve plate secured to the receptacle for mounting the valve body.

3. The dispenser of claim 1 wherein the valve body defines at least one passageway for slidingly receiving the gate means to support the gate for movement between the first and second positions.

4. The dispenser of claim 3 wherein the valve body defines two passageways for receiving spaced portions of the gate means to slidingly support the gate for movement between the first and the second positions.

5. The dispenser of claim 1 further comprising a handle coupled to the gate means to move the gate between the first and the second positions.

6. A dispenser for pulverulent materials, comprising:

a receptacle for receiving a container holding the material, including a support wall for supporting the container, with the support wall defining an opening;

a valve body mounted in the receptacle adjacent the support wall, the valve body defining metering cavities aligned with the support wall opening to receive material from the container which flows through the support wall opening;

a gate means mounted in the receptacle adjacent the valve body for movement between first and second positions, with the gate means blocking flow out of the valve body in the first position and blocking flow past the support wall opening into the valve body, while opening the valve body to dispense material in the metering cavities in the second position; and wherein the receptacle has a scoop frame with an open top and a bottom wall comprising the support wall.

7. The dispenser of claim 6 wherein the frame extends below the bottom wall to mount the valve body and the gate.

8. The dispenser of claim 7 wherein the frame is of generally part cylindrical construction with the bottom portion of the frame adjacent the support wall comprising a cylinder.

9. A dispenser for pulverulent materials, comprising:

a receptacle for receiving a container holding the material, including a support wall for supporting the container, with the support wall defining an opening;

a valve body mounted in the receptacle adjacent the support wall, the valve body defining metering cavities aligned with the support wall opening to receive material from the container which flows through the support wall opening;

a gate means mounted in the receptacle adjacent the valve body for movement between first and second positions, with the gate means blocking flow out of the valve body in the first position and blocking flow past the support wall opening into the valve body, while opening the valve body to dispense material in the metering cavities in the second position; and a screen mounted to the receptacle adjacent the support wall, with the valve body between the screen and the support wall, and with the screen secured to the receptacle.

10. A dispenser for pulverulent materials, comprising:

receptacle for receiving a container holding the material, including a support wall for supporting the container, with the support wall defining an opening;

a valve body mounted in the receptacle adjacent the support wall, the valve body defining metering cavities aligned with the support wall opening to receive material from the container which flows through the support wall opening;

a gate means mounted in the receptacle adjacent the valve body for movement between first and second positions, with the gate means blocking flow out of the valve body in the first position and blocking flow past the support wall opening into the valve body, while opening the valve body to dispense material in the metering cavities in the second position; and a valve plate secured to the receptacle for mounting the valve body, a valve plate cooperating with the support wall to form a substantially enclosed cavity receiving the valve body, and the valve plate defining a series of apertures for ventilation.

11. The dispenser of claim 10 wherein the gate means comprises first and second gate portions, each with at least one aperture, with the apertures of the first and second gate portions laterally spaced from one another.

12. The dispenser of claim 11 wherein the first and second gate portions comprise generally parallel plate members joined together by a joining portion.

13. The dispenser of claim 11 wherein said metering cavities have a first cross-section adjacent the first gate portion and a second cross-section adjacent the second gate portion.

* * * * *